United States Patent
Buck et al.

(10) Patent No.: US 7,302,942 B2
(45) Date of Patent: Dec. 4, 2007

(54) METHOD AND DEVICE FOR OPERATING AN INTERNAL COMBUSTION ENGINE

(75) Inventors: Rainer Buck, Tamm (DE); Michael Scheidt, Stuttgart (DE); Eduard Moser, Ludwigsburg (DE); Martin Schacherer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/595,210

(22) Filed: Nov. 9, 2006

(65) Prior Publication Data

US 2007/0119242 A1 May 31, 2007

(30) Foreign Application Priority Data

Nov. 17, 2005 (DE) .................. 10 2005 054 735

(51) Int. Cl.
*F02D 41/00* (2006.01)
*F02D 41/02* (2006.01)

(52) U.S. Cl. .................................................. 123/676
(58) Field of Classification Search ............... 123/688, 123/676, 703; 73/116; 60/274, 276, 285
See application file for complete search history.

(56) References Cited

U.S. PATENT DOCUMENTS

| | | | | | |
|---|---|---|---|---|---|
| 4,183,335 | A | * | 1/1980 | Asano et al. | 123/688 |
| 4,953,351 | A | * | 9/1990 | Motz et al. | 60/285 |
| 5,129,258 | A | * | 7/1992 | Homeyer | 73/116 |
| 5,322,047 | A | * | 6/1994 | Oliu et al. | 123/676 |
| 6,918,385 | B2 | * | 7/2005 | Ohkuma et al. | 123/694 |
| 2006/0080028 | A1 | * | 4/2006 | Moser et al. | 701/114 |
| 2006/0137436 | A1 | * | 6/2006 | Buck et al. | 73/116 |

FOREIGN PATENT DOCUMENTS

DE   102 004 033 969   8/2005

* cited by examiner

*Primary Examiner*—Mahmoud Gimie
(74) *Attorney, Agent, or Firm*—Kenyon & Kenyon LLP

(57) ABSTRACT

A method and a device for operating an internal combustion engine make it possible to monitor a temperature sensor or a lambda sensor in an exhaust system of the internal combustion engine for functionality in the entire operating range of the internal combustion engine. To that end, the plausibility of the signal of the temperature sensor is checked with a signal of the lambda sensor for a predetermined relationship.

7 Claims, 4 Drawing Sheets

METHOD AND DEVICE FOR OPERATING AN INTERNAL COMBUSTION ENGINE

BACKGROUND INFORMATION

German Patent Application No. DE 102 004 033 969 describes a method and a control unit for exhaust gas temperature regulation, a temperature sensor and a lambda sensor being situated in an exhaust system and the signal of the temperature sensor and the signal of the lambda sensor being supplied to a control unit.

SUMMARY OF THE INVENTION

The method and the device according to the present invention for operating an internal combustion engine have the advantage over the related art that the plausibility of a signal of the temperature sensor is checked with a signal of the lambda sensor for a predetermined relationship. It is possible in this manner to monitor the temperature sensor or the lambda sensor for plausible values in the entire operating range of the internal combustion engine.

It is of particular advantage that the plausibility of the signal of the temperature sensor is checked with the signal of the lambda sensor as a function of an operating point, in particular as a function of an engine speed of the internal combustion engine. This makes it possible to consider the influence of the present operating point on the relationship between the signal of the lambda sensor and the signal of the temperature sensor and thus ensure that the plausibility of the two signals is checked in the entire operating range of the internal combustion engine in a manner which is simple in particular.

The plausibility check may be performed in a manner which is simple in particular if a linear relationship is selected as a predetermined relationship for reasons of simplicity.

A particularly simple and reliable procedure for checking the plausibility is to detect an error of the temperature sensor or of the lambda sensor if, at the present operating point of the internal combustion engine, a value pair derived from the signal of the temperature sensor and the signal of the lambda sensor is outside of a predetermined range of variation around the predetermined relationship.

Advantageously, the range of variation may be predetermined as a function of an operating point, in particular as a function of the engine speed of the internal combustion engine. It is thus possible to adjust the precision of the plausibility check as a function of an operating point, so that for each operating point or operating range of the internal combustion engine, it is possible to achieve the maximum precision in checking the plausibility of the signal of the temperature sensor with the signal of the lambda sensor.

Since the linearity, which is assumed for reasons of simplicity, of the relationship between the signal of the temperature sensor and the signal of the lambda sensor is in particular applicable in the range close to full load, it is advantageously possible to predetermine a smaller range of variation as the engine speed of the internal combustion engine increases, thus increasing the precision of the plausibility check.

In a manner which is advantageous in particular, it is possible to apply the method and the device according to the present invention if the temperature sensor is situated upstream and the lambda sensor is situated downstream from a turbine in the exhaust system of the internal combustion engine. In this case, it is possible to use the plausibility check of the signal of the temperature sensor with the signal of the lambda sensor to ensure to the greatest extent possible that a thermal limit for the operation of the turbine is not exceeded or not met but instead is adhered to as far as possible and thus, for example, a turbocharger driven by the turbine may be operated at maximum power without destruction or damage.

Another advantage is that in the absence of plausibility between the signal of the temperature sensor and the signal of the lambda sensor, the temperature or the oxygen concentration in the exhaust system is modeled from operating variables of the internal combustion engine or emergency operation is initiated or the internal combustion engine is shut off. This ensures that if the signal of the temperature sensor or the lambda sensor is implausible, damage or destruction of the internal combustion engine is prevented.

DETAILED DESCRIPTION

Figure 1:
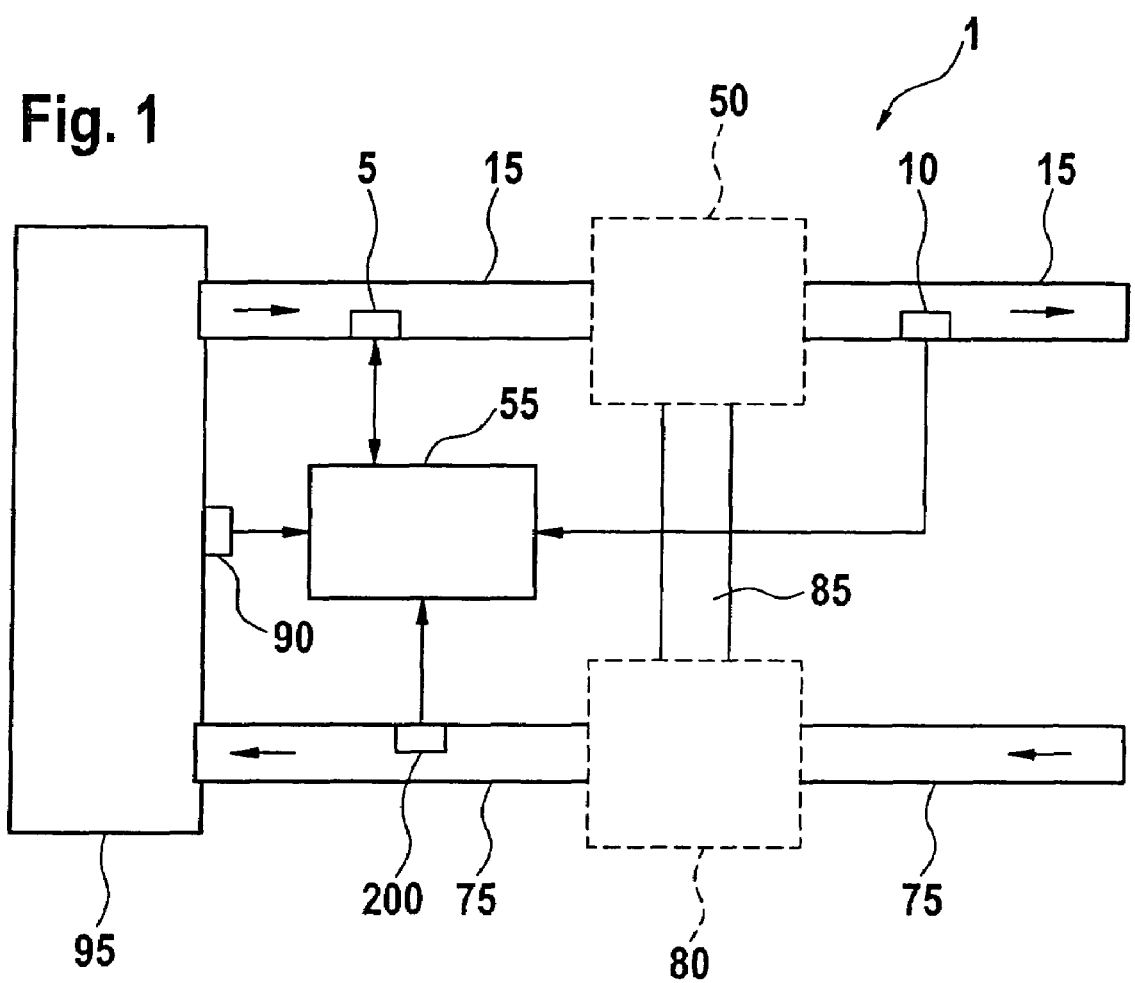
FIG. 1 shows a block diagram of an internal combustion engine.

In FIG. 1, 1 denotes an internal combustion engine which drives, for example, a motor vehicle. Internal combustion engine 1 is designed, for example, as a gasoline engine or a diesel engine. Internal combustion engine 1 includes a combustion engine 95. Combustion engine 95 in turn has one or a plurality of cylinders. Combustion engine 95 is supplied with fresh air via an air supply duct 75. In addition, combustion engine 95 is supplied with fuel, either by direct injection into the combustion chamber of the particular cylinder or by injection into air supply duct 75. This is not shown in FIG. 1 for the sake of clarity. The exhaust gas produced in the combustion chamber of combustion engine 95 during the combustion of the air-fuel mixture is ejected into an exhaust system 15. In the example according to FIG. 1, a turbine 50 of an exhaust turbocharger is situated in exhaust system 15. In FIG. 1, arrows indicate the direction of flow of the fresh air in air supply duct 75, and the direction of flow of the exhaust gas in exhaust system 15. A temperature sensor 5 is situated upstream of turbine 50 in exhaust system 15. Temperature sensor 5 measures the temperature in the exhaust system upstream from turbine 50 continuously or in regular or irregular time intervals. Temperature sensor 5 forwards the measured results in the form of a measuring signal or signal to a controller 55.

A lambda sensor 10 is situated downstream from turbine 50 in exhaust system 15, lambda sensor 10 measuring the oxygen concentration in the exhaust gas downstream of turbine 50 continuously or in regular or irregular time intervals and forwarding the resulting lambda value in the form of a measuring signal or signal to controller 55. In particular in the case in which temperature sensor 5 and/or lambda sensor 10 measure in regular or irregular intervals of time, controller 55 synchronizes these measurements with respect to the time or the crank angle at which the measurements occur. This may occur, for example, as a result of controller 55 prompting both temperature sensor 5 and lambda sensor 10 to measure the temperature and the oxygen concentration, respectively, at specific times or crank angles, in particular at regular or irregular time or crank angle intervals. In this manner, a value pair made up of a temperature value and a lambda value is present at different points in time or crank angles. If continuous measuring signals from temperature sensor 5 and from lambda sensor 10 are present in controller 55 over time, controller 55 scans the two signals in a predetermined scanning pattern or at predetermined times or crank angles, it again being possible for this to be based on regular or irregular time intervals or crank angle intervals.

A value pair made up of a temperature value and a lambda value is then present at each of the scanning times or scanning crank angles. If temperature sensor 5 delivers a continuous signal and lambda sensor 10 delivers a signal only at regular or irregular time or crank angle intervals, controller 55 evaluates the continuous signal of temperature sensor 5 only at times or crank angles at which it also receives the signal of lambda sensor 10. In this manner, a value pair made up of a temperature value and a lambda value is again produced for different points in time or crank angles. The converse applies if lambda sensor 10 delivers a continuous signal to controller 55 and temperature sensor 5 does so only at regular or irregular time or crank angle intervals.

Furthermore, a crank angle sensor 90 is provided, which delivers a continuous signal of the present crank angle of combustion engine 95 to controller 55, so that for each value pair made up of a temperature and a lambda value, the associated crank angle is known in controller 55. Through a temporal differentiation of the signal received from crank angle sensor 90, controller 55 also ascertains the engine speed of internal combustion engine 1, so that the associated engine speed of internal combustion engine 1 is known for each value pair made up of the temperature and the lambda value in controller 55. For the sake of completeness, it should be noted that turbine 50 drives a compressor 80 in air supply duct 75 via a shaft 85 for compressing the fresh air supplied to combustion engine 95.

Figure 2:
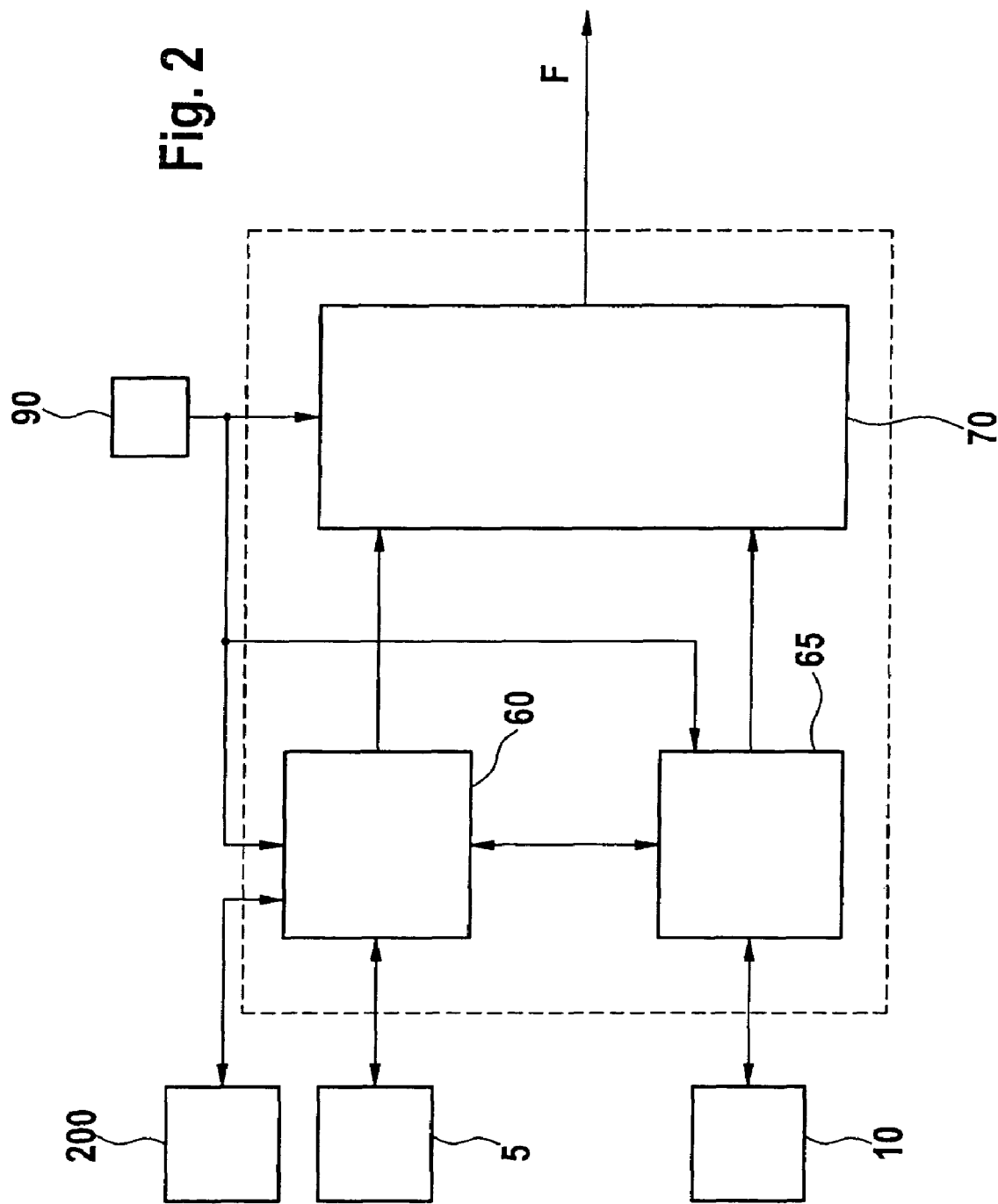
FIG. 2 shows a functional diagram of a device according to the present invention.

A functional diagram of controller 55 is shown in FIG. 2. Identical reference numerals denote the same elements as in FIG. 1. Controller 55 includes a first receiver device 60 which receives the signal from temperature sensor 5. Furthermore, controller 55 includes a second receiver device 65 which receives the signal from lambda sensor 10. The two receiver devices 60, 65 are synchronized with one another as is denoted by the double arrow between first receiver device 60 and second receiver device 65. It is thus possible to implement the measured value synchronization described above, it being possible for first receiver device 60 and/or second receiver device 65 also to prompt temperature sensor 5 or lambda sensor 10 to detect measured values in a synchronously regular or irregular time or crank angle pattern. To this end, the signal of crank angle sensor 90 is supplied to first receiver device 60 and to second receiver device 65 in each case. The value pairs made up of a temperature value and a lambda value formed in this way, each assigned to one crank angle, are forwarded from first receiver device 60 and second receiver device 65 to a plausibility unit 70. The signal of crank angle sensor 90 is also sent to plausibility unit 70 and plausibility unit 70 transforms it into the corresponding engine speed of the internal combustion engine by differentiation. Thus plausibility unit 70 determines the engine speed of internal combustion engine 1 for at least one of the value pairs of temperature and lambda value received from first receiver unit 60 and second receiver unit 65, the engine speed being present at the particular crank angle at which the cited value pair was detected by temperature sensor 5 and by lambda sensor 10.

For this engine speed, a predetermined relationship is obtained from a memory assigned to plausibility unit 70 and not shown in FIG. 2, and it is checked if the value pair of temperature and lambda value supplied to plausibility unit 70 is consistent with the predetermined relationship obtained. If this is the case, plausibility unit 70 detects that both temperature sensor 5 and lambda sensor 10 are functioning flawlessly. Otherwise, plausibility unit 70 detects an error of temperature sensor 5 or of lambda sensor 10 and emits a corresponding error signal F. Through this error signal F, it is possible, for example, to initiate emergency operation of internal combustion engine 1 or to shut off internal combustion engine 1. However, error signal F may also be used to prompt the use of a value modeled from operating variables of internal combustion engine 1 in a manner known to those skilled in the art for the temperature upstream from or the oxygen concentration downstream from turbine 50 instead of the measured value of temperature sensor 5 or of lambda sensor 10, so that it is not necessary to use a faulty signal of temperature sensor 5 or of lambda sensor 10.

In the event that the functionality of temperature sensor 5 is to be monitored using the described method and the described device, it must be ensured that lambda sensor 10 will function flawlessly. To this end, the plausibility of the functionality of lambda sensor 10 must be checked in another manner known to those skilled in the art. If the plausibility of lambda sensor 10 is determined to be error-free and it is detected that the signal of temperature sensor 5 and the signal of lambda sensor 10 do not correspond with the predetermined relationship in the manner described, temperature sensor 5 is determined to be faulty and from that point on, a temperature modeled from operating variables of internal combustion engine 1 in a manner known to those skilled in the art is used instead of the signal from the temperature sensor or emergency operation is initiated or internal combustion engine 1 is shut off. Conversely, it is also possible to use the described method and the described device to monitor the function of lambda sensor 10. To that end, the plausibility of the function of temperature sensor 5 is accordingly checked in another manner. If temperature sensor 5 is determined to be error-free in this manner, a value pair made up of the signal of temperature sensor 5 and the signal of lambda sensor 10 outside of the predetermined relationship results in the function of lambda sensor 10 being determined to be faulty. In this case, the oxygen concentration in exhaust system 15 downstream of turbine 50 is modeled from operating variables of internal combustion engine 1 in the manner known to those skilled in the art or emergency operation of internal combustion engine 1 is initiated or internal combustion engine 1 is shut off.

The described method and the described device are used in particular for checking the plausibility of the function of temperature sensor 5. The reason for this is as follows: the combustion parameters in the engine application, i.e., in the case of the gasoline engine, for example, the ignition angle to be set, the air mass flow to be supplied and/or the fuel quantity to be injected, are designed, for example, in such a way that the exhaust gas turbocharger must be operated very close to its thermal limit. Temperature sensor 5 is used for this purpose. The combustion parameters are corrected in such a way that due to system tolerances, it is impossible to exceed or not meet a predetermined limiting value for the temperature measured by temperature sensor 5. Exceeding the limiting value has a critical effect since the turbocharger may be destroyed. The effect of not meeting the limiting value is inadequate power. For that reason, it is important for temperature sensor 5 to operate without errors and deliver plausible values concerning the entire operating range of internal combustion engine 1. Such a plausibility check of temperature sensor 5 or of lambda sensor 10 is possible using the described method and the described device in the entire operating range of internal combustion engine 1. To this end, a predetermined relationship between the temperature and the lambda value is stored as a function of the operating point of internal combustion engine 1. This relationship may be determined, for example, by a test bench measurement. If the assigned relationship between temperature and lambda value is stored for each operating point of the internal combustion engine, plausibility unit 70 compares the value pair made up of temperature and lambda value received from receiver devices 60, 65 for an operating point of internal combustion engine 1 with the predetermined relationship between temperature and lambda value determined on the test bench for this operating point. If they match, temperature sensor 5 and lambda sensor 10 are operating without error; otherwise, an error is present.

In the example described according to FIG. 2, the engine speed was used as a substitute for the operating point of internal combustion engine 1. In addition, it is of course possible to use other operating variables which influence the operating point of internal combustion engine 1 such as, for example, the cylinder charge. However, for the sake of simplicity and as an example, only the dependency of the relationship between temperature and lambda value on engine speed will be observed in the following. Furthermore, a simplification is achieved if the relationship between the temperature upstream from turbine 50 and the lambda value downstream from turbine 50 in the exhaust system is assumed to be roughly linear. In this case, the determination of the predetermined relationships between temperature and lambda value by the test bench measurement is considerably simplified. The relationship between the temperature upstream from turbine 50 and the lambda value downstream from turbine 50 may be traced to the following physical relationships:

$$Q \sim c_W \times m_L \times \Delta T_3 \quad (1).$$

In relationship (1) Q is the heat flux produced by combustion engine 95 by combustion of the air-fuel mixture. $c_W$ is a thermal coefficient and $m_L$ is the air mass flow supplied to combustion engine 95 via air supply duct 75. $\Delta T_3$ is the difference $T_3-T_2$ between temperature $T_3$ in exhaust system 15 upstream from turbine 50 and temperature $T_2$ in air supply duct 75 downstream from compressor 80. Heat flux Q may also be described in yet another manner:

$$Q = H_u \times m_E \quad (2).$$

$H_u$ is the calorific value of the fuel mass and $m_E$ is the mass flow of the injected fuel mass. The following results from relationships (1) and (2):

$$\Delta T_3 \sim H_u \times m_E / (c_W \times m_L) \quad (3).$$

It is also true that:

$$H_u \times m_E / (c_W \times m_L) \sim 1/\lambda \quad (4).$$

The following results from relationships (3) and (4):

$$\Delta T_3 \sim 1/\lambda \quad (5).$$

In determining the predetermined relationship between temperature $T_3$ in exhaust system 15 downstream from turbine 50 and lambda value $\lambda$ in exhaust system 15 downstream from turbine 50 on the test bench, temperature $T_2$ in air supply duct 75 is maintained downstream from compressor 80 so that a linear relationship results between $1/\lambda$ and $T_3$, the offset of which is a function of temperature $T_2$. Temperature $T_2$ in air supply duct 75 downstream from compressor 80 is measured by a temperature sensor 200 or modeled from operating variables of internal combustion engine 1 in a manner known to one skilled in the art. In the case of the measurement, temperature $T_2$ is detected in chronological or crank angle synchronism using temperature sensor 200 in the same manner as temperature $T_3$, the corresponding measuring signal also being received or requested by first receiver device 60. First receiver device 60 then forwards the measured value for temperature $T_3$ as well as the assigned measured value for temperature $T_2$ to plausibility unit 70.

Figure 3:
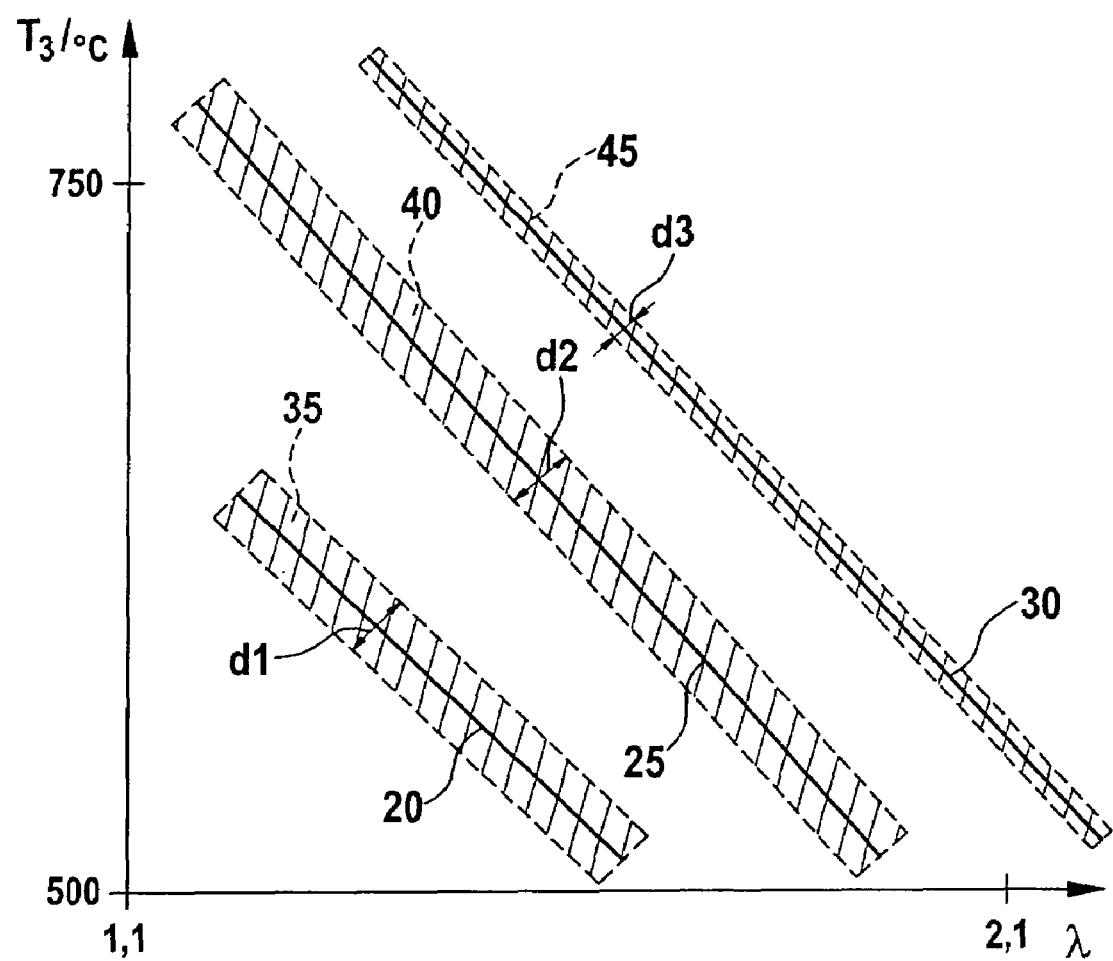
FIG. 3 shows a diagram of an exhaust gas temperature across a lambda value.

At a constant temperature $T_2$ based on relationship (5), a linear relationship thus results between temperature $T_3$ and lambda reciprocal $1/\lambda$. As described, this relationship is measured on a test bench for a fixedly predetermined temperature $T_2$. This shows that the relationship between temperate $T_3$ and lambda value $\lambda$ is also a function of the engine speed of internal combustion engine 1. FIG. 3 shows a diagram of temperature $T_3$ in degrees Celsius across lambda value $\lambda$ as could be determined, for example, on a test bench, only the qualitative observation of the diagram in FIG. 3 being significant in the following, a linear representation of it being shown for reasons of simplicity. For a first engine speed nmot1 of internal combustion engine 1, a first relationship 20 predetermined by the test bench measurement to be linear for reasons of simplicity results between temperature $T_3$ and lambda value $\lambda$. For a second engine speed nmot2>nmot1, a second relationship 25 predetermined by the test bench measurement to be linear for reasons of simplicity results between temperature $T_3$ and lambda value $\lambda$. For a third engine speed nmot3>nmot2, a third relationship 30 predetermined by the test bench measurement to be linear for reasons of simplicity results between temperature $T_3$ and lambda value $\lambda$. In this connection, it may be seen that as engine speed nmot increases, the offset of the resulting relationship between temperature $T_3$ and lambda value $\lambda$, which is linear for reasons of simplicity, increases.

If plausibility unit 70 receives a value pair made up of temperature $T_3$ and lambda value $\lambda$ from receiver devices 60, 65, plausibility unit 70 first checks to determine which engine speed nmot is assigned to this value pair, i.e., was present when this value pair was measured from temperature $T_3$ and lambda value $\lambda$ by temperature sensor 5 and lambda sensor 10. Plausibility unit 70 determines the relationship between temperature $T_3$ and lambda value $\lambda$, which is assigned to this engine speed and predetermined on the test bench as linear for reasons of simplicity. Plausibility unit 70 then determines the deviation between temperature $T_2$ at the time the value pair made up of temperature $T_3$ and lambda value $\lambda$ is detected and temperature $T_2$ set for the test bench measurement. Plausibility unit 70 then shifts the offset of the determined relationship as a function of the determined deviation of temperature $T_2$ according to the proportionality found according to relationship (5), i.e., with consideration of the proportionality constants on which the proportionality is based. Plausibility unit 70 then checks if the determined value pair deviates from the determined relationship. If this is the case, error signal F is generated; otherwise temperature sensor 5 and lambda sensor 10 are recognized as plausible.

Since even an error-free temperature sensor 5 and an error-free lambda sensor 10 have certain measurement tolerances, it is advantageous if a range of variation is defined around the ascertained predetermined relationship. If the detected value pair made up of temperature $T_3$ and lambda value $\lambda$ is in the defined range of variation around the relationship between temperature $T_3$ and lambda value $\lambda$ determined to be linear for purposes of simplicity, temperature sensor 5 and lambda sensor 10 are detected to be error-free; otherwise, error signal F is generated. In addition, it may be provided that the range of variation is predetermined as a function of an operating point, in particular as a function of the engine speed of internal combustion engine 1. This is shown in FIG. 3. In FIG. 3, a first range of variation 35 is defined for first predetermined relationship 20. It embeds first predetermined relationship 20 centrally between two straight lines running parallel to first predetermined relationship 20, which are distanced from one another by a first distance $d_1$. A second range of variation 40 is defined for second predetermined relationship 25. This embeds second predetermined relationship 25 centrally between two straight lines running parallel to second predetermined relationship 25, which are distanced from one another by a second distance $d_2<d_1$. A third range of variation 45 is defined for third predetermined relationship 30. Third predetermined relationship 30 lies in the center of third range of variation 45 which is formed by two straight lines parallel to third predetermined relationship 30, which are distanced from one another by a third distance $d_3$, $d_3$ being smaller than $d_2$. Accordingly, ranges of variation 35, 40, 45 become smaller as the engine speed of the internal combustion engine increases. The reason for this is that the relationship (5) is increasingly more accurate as the engine load and engine speed increase, so that the range of variation may be selected to be smaller as the engine speed increases.

The application of the described method according to the present invention and the described device according to the present invention are in particular suitable for quasi-stationary operating conditions of internal combustion engine 1 with consideration of the normally varying dynamics of temperature sensor 5 and lambda sensor 10. In such a quasi-stationary operating condition, temperature sensor 5 and lambda sensor 10 should be in an essentially constant operating condition for the implementation of the method according to the present invention and the device according to the present invention.

For the function of the present invention, it is moreover immaterial whether or not turbine 50 and accordingly the turbocharger are present.

The relationship between temperature $T_3$ and lambda value $\lambda$, which is predetermined to be linear for reasons of simplicity, may be determined for as many different engine speeds of the internal combustion engine as possible in order to cover the entire operating range of the internal combustion engine as extensively as possible. In particular, it is possible to determine more relationships which are dependent on the engine speed than the three shown in FIG. 3.

Figure 4:
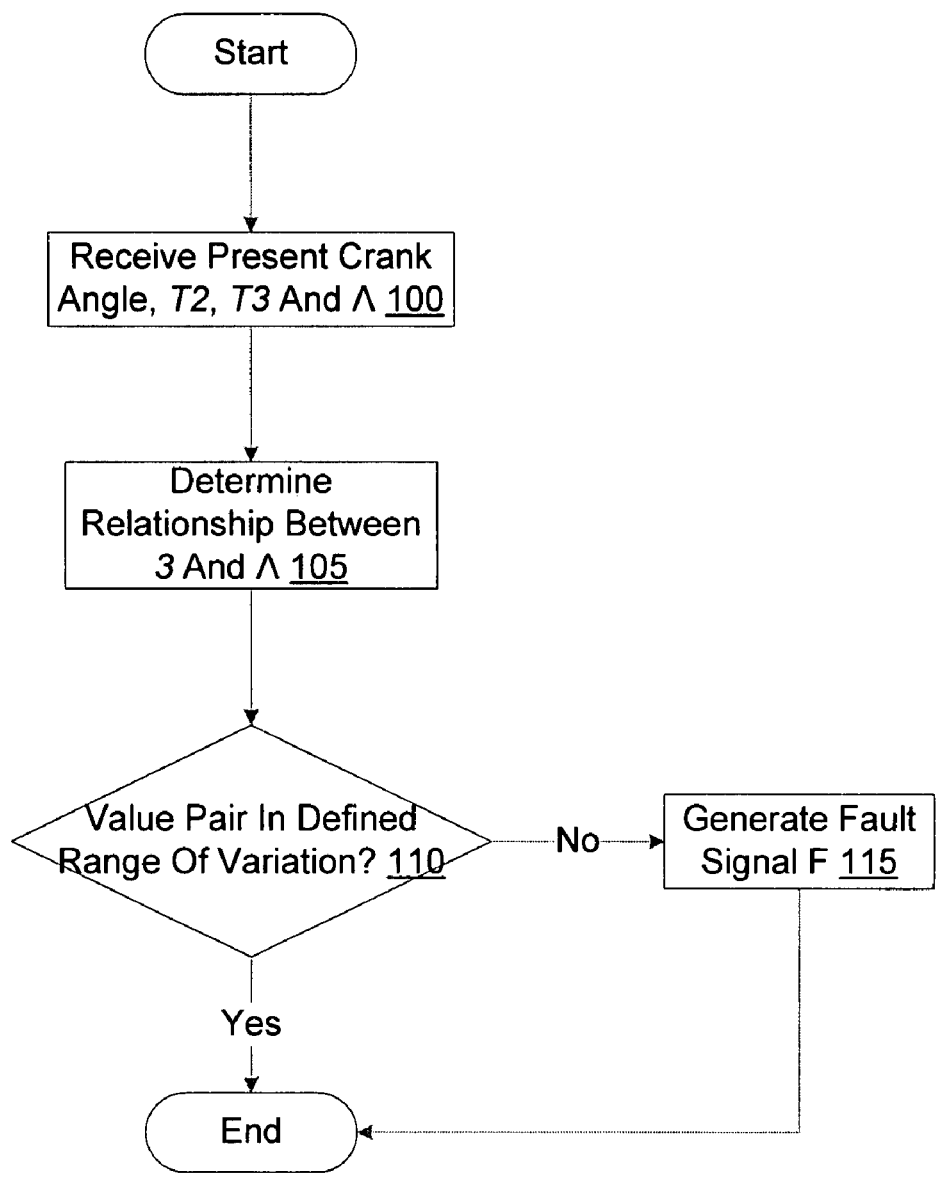
FIG. 4 shows a flow chart for an exemplary sequence of the method of the present invention.

A flow chart for an exemplary sequence of the method according to the present invention is shown in FIG. 4. After the start of the program, at a program point 100, the present crank angle, present temperature $T_2$, present temperature $T_3$ and present lambda value $\lambda$ are received by receiver devices 60, 65 in the manner described and forwarded to plausibility unit 70. Subsequently, a branching is made to a program point 105.

For the present engine speed determined by differentiating the signal of crank angle sensor 90, at program point 105, plausibility unit 70 determines the relationship, which is predetermined to be linear for reasons of simplicity, between temperature $T_3$ and lambda value $\lambda$ including the range of variation defined for it and if necessary shifts the offset of this relationship as a function of present temperature $T_2$ in the manner described. Subsequently, a branching is made to a program point 110.

At program point 110, plausibility unit 70 checks if the presently determined value pair made up of temperature $T_3$ and lambda value $\lambda$ is in the defined range of variation of the predetermined relationship between temperature $T_3$ and lambda value $\lambda$, which is determined to be linear for reasons of simplicity. If this is the case, the program ends; otherwise, it branches to a program point 115.

At program point 115, plausibility unit 70 generates fault signal F. Subsequently the program ends.

What is claimed is:

1. A method for operating an internal combustion engine, a temperature sensor and a lambda sensor being situated in an exhaust system of the internal combustion engine, the method comprising:

checking a plausibility of a signal of the temperature sensor with a signal of the lambda sensor for a predetermined relationship; and detecting an error of at least one of the temperature sensor and the lambda sensor if, at a current operating point of the internal combustion engine, a value pair from the signal of the temperature sensor and the signal of the lambda sensor is outside of a predetermined range of variation around the predetermined relationship.

2. The method according to claim 1, wherein the plausibility of the signal of the temperature sensor is checked with the signal of the lambda sensor as a function of an operating point, including as a function of an engine speed of the internal combustion engine.

3. The method according to claim 1, wherein the predetermined relationship is a linear relationship.

4. The method according to claim 1, wherein the range of variation is predetermined as a function of an operating point, including as a function of an engine speed of the internal combustion engine.

5. The method according to claim 4, wherein the range of variation is predetermined to be smaller as the engine speed of the internal combustion engine increases.

6. A method for operating an internal combustion engine, a temperature sensor and a lambda sensor being situated in an exhaust system of the internal combustion engine, the method comprising:

checking a plausibility of a signal of the temperature sensor with a signal of the lambda sensor for a predetermined relationship, wherein the temperature sensor is situated upstream and the lambda sensor is situated downstream from a turbine in the exhaust system.

7. A method for operating an internal combustion engine, a temperature sensor and a lambda sensor being situated in an exhaust system of the internal combustion engine, the method comprising:

checking a plausibility of a signal of the temperature sensor with a signal of the lambda sensor for a predetermined relationship, wherein in the absence of plausibility between the signal of the temperature sensor and the signal of the lambda sensor, at least one of a temperature and an oxygen concentration in the exhaust system is modeled from operating variables of the internal combustion engine, an emergency operation is initiated, or the internal combustion engine is shut off.

* * * * *